March 17, 1964 I. J. HEINEN 3,125,323
GATE TYPE SEAL VALVE
Filed April 4, 1960 2 Sheets-Sheet 1

IRVING JOSEPH HEINEN,
INVENTOR.
WHANN & McMANIGAL
Attorneys for Applicant

March 17, 1964
I. J. HEINEN
3,125,323
GATE TYPE SEAL VALVE
Filed April 4, 1960
2 Sheets-Sheet 2
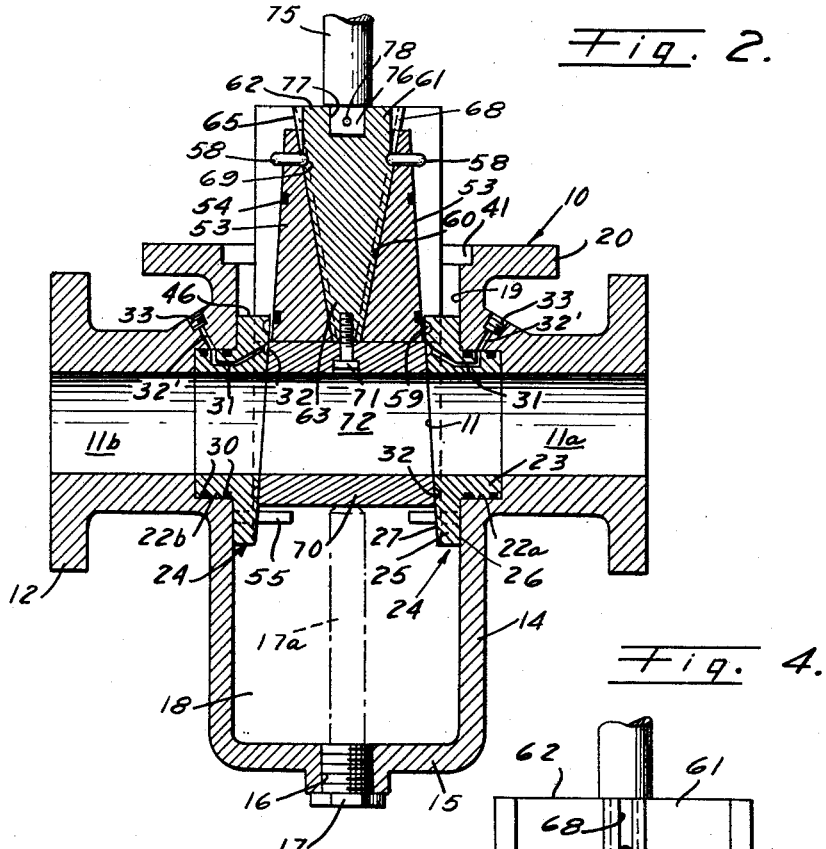
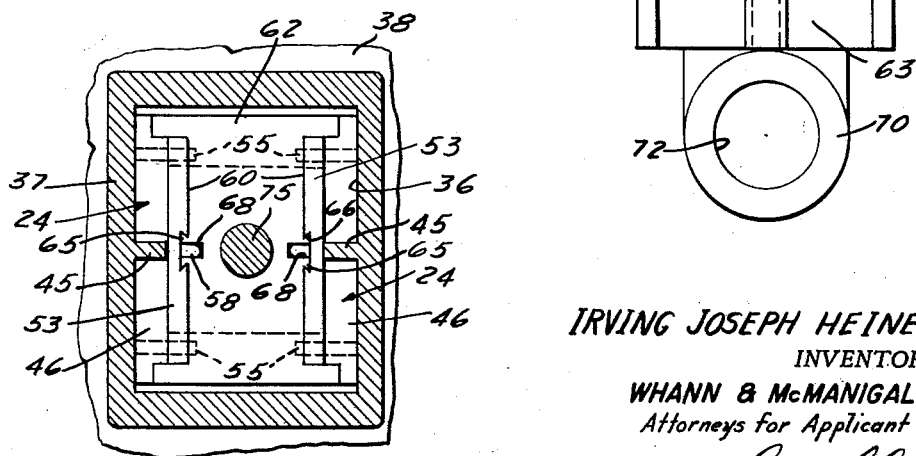
IRVING JOSEPH HEINEN,
INVENTOR.
WHANN & McMANIGAL
Attorneys for Applicant United States Patent Office 3,125,323
Patented Mar. 17, 1964

3,125,323
GATE TYPE SEAL VALVE
Irving Joseph Heinen, 4206 Fleetwood Haven Road,
Lakewood Estates, Long Beach, Calif.
Filed Apr. 4, 1960, Ser. No. 19,591
2 Claims. (Cl. 251—197)

This invention relates generally to fluid control valves, and relates more particularly to gate-type valves.

While the present invention has particular utility in valves for controlling the flow in conduits carrying fluid, such as gas or oil or the like, under high pressure, and is shown and described in such connection, it is to be understood that its utility is not confined thereto.

As is well known, various problems are encountered in providing valves for controlling the flow of high pressure fluid through conduits. For example, difficulty is often encountered in getting a proper seal between the movable gate assembly and the body of the valves. A related problem is the repair of the valve when parts become worn.

It is an important object of the invention to provide a valve that will solve the above referred to problems.

Another object of the invention is to provide a gate valve of this character wherein a tight seal is provided between the gate assembly and the body of the valve.

Still another object of the invention is to provide a gate valve of this character having wedge guide means.

A further object of the invention is to provide mechanism of this character having means for locking the movable valve assembly in the valve closed position.

Still another object of the invention is to provide a device of this character which may be readily repaired without removing the valve from the pipeline in which it is installed.

A further object of the invention is to provide a device of this character wherein worn parts may be replaced while the pressure is still on the pressure line.

Another object of the invention is to provide a device of this character that is relatively simple in construction and operation.

A further object of the invention is to provide a device of this character that is relatively inexpensive to manufacture.

The characteristics and advantages of the invention are further sufficiently referred to in connection with the following detailed description of the accompanying drawings, which represent one embodiment. After considering this example, skilled persons will understand that variations may be made without departing from the principles disclosed and I contemplate the employment of any structures, arrangements or modes of operation that are properly within the scope of the appended claims.

Referring to the drawings, which are for illustrative purposes only:

FIG. 2 is a similar view of said valve with the bonnet removed and showing the device in the open position;

FIG. 3 is a sectional view taken on line 3—3 of FIG. 1; and

FIG. 4 is an external view of the gate assembly.

Figure 1:
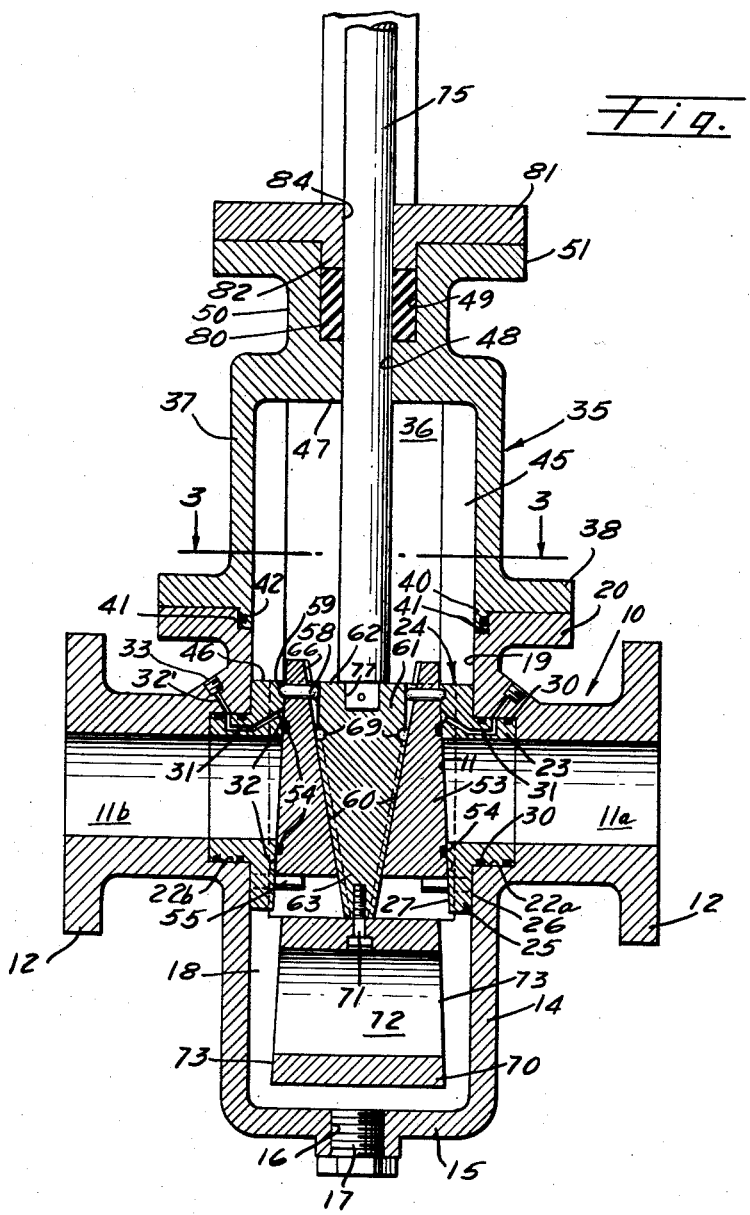
FIG. 1 is a longitudinal section through a valve embodying the present invention and showing said valve in the closed position.

Referring more particularly to the drawings, the device comprises a body, indicated generally at 10, having a flow passage therethrough having aligned parts 11a and 11b, there being the usual flanges 12 at the outer ends of the flow passage whereby the valve may be attached to fluid carrying conduits. The body includes a depending hollow casing defined by peripheral wall 14 and a bottom wall 15 having a tapped opening 16 in which an externally threaded plug 17 is normally disposed. The wall 14 and bottom 15 define a chamber 18 normal to the passage 11 and opening thereinto at the upper end. At the opposite side of the passage 11 and in alignment with the chamber 18 there is a guide passage 19 which is of the same cross-sectional size and configuration as the chamber 18, said guide passage 19 communicating at its lower end with the passageway 11, the opposite or upper end of the guide passage 19 being open and being provided with an external outwardly extending flange 20.

The inner ends of the flow passage parts 11a and 11b are enlarged as at 22a and 22b for reception of corresponding outer end parts 23 of valve seat members, indicated generally at 24, said valve seat members including inner portions 25 integral with the parts 23. The parts 25 of the valve seat members have outer faces 26 which abut against the adjacent inner surfaces of the walls of chamber 18 and passage 19 of the valve body. The inner surfaces 27 of the valve seat members 24 are tapered and converge upwardly at a slight angle. The parts 23 of each of the valve seat members are provided with a pair of axially spaced exterior grooves which have sealing elements 30 disposed therein to provide a seal between the parts 23 and the annular wall of the enlarged portions at the inner ends of the passage parts 11a and 11b. The sealing elements 30 may be O-rings or the like and are spaced axially apart.

A lubricating passage 31 is provided in each of the valve seat members 24 with the inner ends of said passages communicating with grooves 32 in the tapered inner faces 27 of said members. The opposite ends of said lubricating passages 31 are in register with the inner ends of passages 32' in the body 10, the outer ends of said passages 32' being counterbored at 33 and internally threaded for reception of a lubricating fixture of any well known character. It is to be noted that the passages 31 terminate at their outer ends between the sealing elements 30.

The valve is provided with a bonnet, indicated generally at 35, which has a chamber 36 therein defined by peripheral walls 37. At the lower end of the bonnet there is an external flange 38 corresponding to the flange 20 of the body and the flanges 20 and 38 are adapted to be secured together by any suitable means, such as screws, bolts, or the like, not shown. The chamber 36 of the bonnet is of the same configuration as the guide passage 19 and comprises an extension of said guide passage. A depending flange 40 extends below the flange 38 and is received in an enlarged recess 41 in the adjacent portion of the body, there being a seal 42 disposed in an external recess in the flange 40 to provide a seal between said flange 40 and the adjacent portion of the body. The bonnet is provided with a pair of oppositely arranged vertcially extending flanges 45 which project downwardly below the lower end of the bonnet and abut against the upper sides 46 of the valve seat members 24.

The upper end of the chamber 36 is closed by an end wall 47 having a vertical opening 48 therethrough which communicates at the upper end with the bottom of a recess 49 in an upwardly extending neck 50 of the bonnet. The recess 49 is of greater diameter than the opening 48 and the upper end of said neck is provided with an outwardly extending flange 51.

There is a movable valve assembly comprising a pair of oppositely arranged slips 53 having their outer faces inclined at the same angle as the inner faces 27 of the valve seat members 24, and engageable therewith when the valve is in the closed position, as best shown in FIG. 1. Grooves are provided in the outer faces of the slips for reception of sealing elements 54 to provide a seal between the abutting faces of the slips and valve seat members. The lower ends of the slips are adapted to rest on stops 55 extending inwardly from and integral with the side walls of the part 24. Slips 53 are provided adjacent their upper ends with openings parallel to the flow passage through the valves and in which are received movable pins, or detents, 58, which have rounded ends, the outer ends of said pins being received, when the valve is in the closed position, in detent recesses 59 provided therefor in the adjacent faces of the valve seat members 24.

The inner faces 60 are spaced apart and diverge upwardly, there being a wedge 61 disposed in the space between said slips. The outer sides of the wedge 61 are inclined to correspond to the inner faces 60 of the slips and when the valve is closed the wedge is in the position shown in FIG. 1, with the upper end 62 of said wedge disposed below the upper ends of the slips, there being a lower end portion 63 of the wedge which extends below the lower ends of said slips.

Wedge 61 is provided with oppositely arranged longitudinally extending flanges 65 that are dovetailed in cross section, said flanges being received in corresponding dovetailed longitudinally extending grooves 66 in the adjacent slips 53. When the flanges 65 are disposed in the groove 66 the adjacent faces of the wedge and respective slips are in contact with each other and will be maintained in sliding contact.

At its upper end wedge 61 is provided with oppositely arranged longitudinally extending grooves 68 which are formed in the respective flanges 65 and which are open at the upper ends. The inner surfaces of the grooves 68 abut the inner ends of the detents 58 so as to hold them outwardly in recesses 59 to allow the wedge 60 to be lifted when the valve is to be opened. At the lower end of each of the grooves 68 there is a detent recess 69, the purpose of which will be described hereinafter. It is to be noted that the bottoms of the recesses 68 are parallel to each other.

A conduit sleeve 70 is attached to the lower end of the wedge by means of a screw or bolt 71 and said conduit sleeve has a passage 72 extending longitudinally therethrough of substantially the same diameter as the diameter of the passage portion 11a and 11b. The sides of the conduit sleeve are inclined upwardly and inwardly at the same angle as the outer faces of the slips 53, so as to snugly engage the respective surfaces 27 of the adjacent valve seat members 24 when the valve is in the open position, as best shown in FIG. 2. With the conduit sleeve in the position shown in FIG. 2 the passage 72 thereof registers with the respective parts 11a and 11b of the flow passage through the valve to thereby connect said parts together.

The valve mechanism is provided with a stem 75 having a round lower end portion 76 received in a corresponding recess 77 in the upper end of the wedge and the parts are secured together by means of a pin 78. Stem 75 extends upwardly through the opening 48 in the bonnet and through the recess 49, there being a packing element 80 in said recess which is secured in position by means of a retaining member 81 secured to the flange 51 of the bonnet by any suitable means, such as bolts or screws, not shown. The retaining member 81 is provided with a depending boss 82 which is received in the recess 49 and compacts the sealing element 80, said retainer having a passage 84 therethrough for operable reception of the stem 75.

Any suitable well known means, such as a hand wheel or the like, not shown, may be used to actuate the valve stem 75 and the movable valve assembly, said stem and valve assembly being moved longitudinally relative to the axis of said stem.

Briefly, the assembly of the mechanism is as follows:

The conduit sleeve is first placed in chamber 18 after which the insert seats 24 are inserted into the body with the parts 23 thereof disposed in the enlarged parts 22a and 22b. The plug 17 is removed and the conduit sleeve is moved into engagement with the seats 24 by means of rods 17a, as shown in dotted lines in FIG. 2. Wedge 61 is then seated on the conduit sleeve and the parts connected by means of the screw 71. This is accomplished through portions 11a or 11b of the flow passage, since these passage parts are of sufficient size so that the assembler's hand is readily received therein and after the screw 71 has been initially screwed into the wedge a suitable wrench may be used to tighten said screw.

The slips 53 and pins 58 are assembled into the valve structure after which rod 17a is removed. The wedge assembly is then expanded to the closed position and the bonnet thereafter attached.

In order to open the valve the stem 75 is raised and the wedge is thereby moved upwardly until the recesses 69 are in alignment with the detents 58 at which time the latter are moved upwardly by the lower surfaces of the former, the said lower surfaces extending farther outwardly than the bottoms or inner surfaces of the grooves 68. This then exerts an upward force on the recesses 59 in the seat and the curved ends of the detents slip out of them so as to unlatch the slips 53 relative to the seat members 24. As the wedge moves upwardly the slips 53 are pulled inwardly a sufficient distance to clear the upper ends of the valve seat members 24 and the flanges 45, and when the wedge has been raised to the point whereat the inner ends of the pins 58 enter the recesses 69 the upper end of the conduit sleeve will engage the lower end of the slips 53 and further upward movement of the stem will effect raising of the entire movable valve assembly, the outer ends of pins 58 riding on inner edges of the flanges 45. Further upward movement of the valve assembly will cause the conduit sleeve to seat against the valve seat members 24 and provide a continuous flow passage through the valve.

Closing of the valve is effected by reverse movement of the valve stem 75 which will result in a reversal of the sequence of operation described in connection with effecting opening of the valve.

When the movable valve assembly is moved to the open position the plug 17 may be removed and a bolt having a stem, such as indicated in dotted lines at 17a in FIG. 2, inserted in the tap opening 16 to retain the conduit sleeve 70 in the seated position of FIG. 2. Thereafter the bonnet 35 may be removed and the slips removed for repair or replacement. After the parts of the movable valve assembly have been repaired the bonnet is replaced on the valve body and the mechanism is ready for normal actuation.

The invention and its attendant advantages will be understood from the foregoing description. It will be apparent that various changes may be made in the form, construction and arrangement of the parts of the invention and the method of operation thereof without departing from the spirit and scope thereof or sacrificing its material advantages, the embodiment hereinbefore described being merely for purposes of illustration.

I claim:

1. A gate type valve, comprising: a casing having a chamber therein and having a flow passage therethrough comprising oppositely arranged aligned flow passage parts communicating at their inner ends with said chamber; valve seat members mounted at the inner ends of said passage parts and having inner faces inclined inwardly and upwardly and having detent recesses adjacent the upper ends; a bonnet having longitudinally extending internal flanges spaced apart and in a plane of the axis of the flow passage; a pair of slips having their outer faces inclined to correspond with the inclination of the adjacent inner faces of the valve seat members, the inner faces of said slips being spaced apart longitudinally relative to the flow passage and inclined to diverge upwardly, said slips having oppositely arranged upwardly extending dovetailed recesses in their inner faces and horizontally arranged axially aligned openings adjacent the upper ends; stops within the chamber limiting downward movement of the slips; pins slidable in the openings in the upper ends of said slips and having their outer ends received in said detent recesses adjacent the upper ends of said valve seat members when the slips are resting on said tops; a wedge having its outer faces inclined to correspond to the inclination of the inner faces of the slips; vertically arranged dovetailed flanges on the sides of the wedge, said flanges being slidably received in the corresponding dovetailed recesses in the slips, the dovetailed flanges of the wedge having vertically extending grooves in the upper ends thereof, said grooves being open at the top and there being respective detent recesses at the lower ends thereof for reception of the inner ends of said pins when the wedge is raised to a predetermined position; a conduit sleeve having a longitudinally extending passage therethrough secured to the lower end of the wedge, the ends of said conduit sleeve being inclined to correspond to the inclination of the inner faces of the valve seat members, said conduit sleeve being spaced a predetermined distance below the lower ends of the slips when the wedge is in the lower position whereat the valve is closed, said conduit sleeve being engageable with the lower ends of the slips when the wedge is raised a predetermined distance and when said slips are raised the outer ends of said pins ride on the flanges in the bonnet; and means for raising and lowering the wedge.

2. A gate type valve, comprising: a casing having a chamber therein and having a flow passage therethrough, including oppositely arranged aligned flow passage parts communicating at their inner ends of said chamber; valve seat members mounted at the inner ends of said passage parts and having inner faces inclined inwardly and having detent recesses adjacent the upper ends thereof; a bonnet having longitudinally extending internal flanges at opposite sides; and a movable valve assembly including a pair of slips having their outer faces adapted to seat on the adjacent inner faces of the valve seat members, the inner faces of said slips being spaced apart longitudinally relative to the flow passage and inclined to diverge upwardly, said slips having oppositely arranged upwardly extending dovetailed recesses in their inner faces and horizontally arranged axially aligned openings adjacent the upper ends; stops within the chamber limiting downward movement of the slips; detents slidable in the openings in the upper ends of said slips and having their outer ends received in said detent recesses adjacent the upper ends of said valve seat members when the slips are resting on said stops; a wedge having its outer faces inclined to correspond to the inclination of the inner faces of the slips; vertically arranged dovetailed flanges on the sides of the wedge, said flanges being slidably received in the corresponding dovetailed recesses in the slips, the dovetailed flanges of the wedge having vertically extending grooves in the upper ends thereof, said grooves being open at the top and there being respective detent recesses at the lower ends thereof for reception of the inner ends of said detents when the wedge is raised to a predetermined position; a conduit sleeve having a longitudinally extending passage therethrough secured to the lower end of the wedge, the ends of said conduit sleeve being inclined to seat on the inner faces of the valve seat members, said conduit sleeve engageable with the lower ends of the slips when the movable valve assembly is being actuated in the valve opening direction, and when said slips are raised the outer ends of said detents slide on the inner edges of the flanges in the bonnet; and means for raising and lowering the movable valve assembly.

References Cited in the file of this patent

UNITED STATES PATENTS

| | | |
|---|---|---|
| 2,658,712 | Stradtmann | Nov. 10, 1953 |
| 2,906,491 | Young | Sept. 29, 1959 |

FOREIGN PATENTS

| | | |
|---|---|---|
| 455,907 | Germany | Feb. 11, 1928 |
| 672,938 | Germany | Mar. 13, 1939 |